US012068967B2

(12) United States Patent
Rekhate et al.

(10) Patent No.: US 12,068,967 B2
(45) Date of Patent: *Aug. 20, 2024

(54) FILTERING AND CLASSIFYING MULTICAST NETWORK TRAFFIC

(71) Applicant: VMware LLC, Palo Alto, CA (US)

(72) Inventors: Vaibhav Mohan Rekhate, Palo Alto, CA (US); Leena Shuklendu Soman, Pune (IN)

(73) Assignee: VMware LLC, Palo Alto, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/576,442

(22) Filed: Jan. 14, 2022

(65) Prior Publication Data

US 2022/0141145 A1 May 5, 2022

Related U.S. Application Data

(63) Continuation of application No. 16/830,326, filed on Mar. 26, 2020, now Pat. No. 11,228,531.

(30) Foreign Application Priority Data

Jan. 15, 2020 (IN) .............................. 202041001764

(51) Int. Cl.
*H04L 47/2441* (2022.01)
*H04L 12/18* (2006.01)

(52) U.S. Cl.
CPC .......... *H04L 47/2441* (2013.01); *H04L 12/18* (2013.01)

(58) Field of Classification Search
CPC ...... H04L 47/2441; H04L 12/18; H04L 45/16
See application file for complete search history.

(56) References Cited

U.S. PATENT DOCUMENTS

| | | | |
|---|---|---|---|
| 2015/0127797 A1* | 5/2015 | Attar | H04L 45/38 709/223 |
| 2016/0065386 A1* | 3/2016 | Hari | H04L 41/40 370/254 |
| 2016/0241435 A1* | 8/2016 | Iordache | H04L 43/062 |
| 2016/0301655 A1* | 10/2016 | Lim | H04L 61/58 |
| 2018/0041555 A1* | 2/2018 | Manohar | H04L 65/611 |
| 2019/0229937 A1* | 7/2019 | Nagarajan | H04L 12/18 |
| 2020/0036552 A1* | 1/2020 | Boutros | H04L 45/64 |
| 2021/0099532 A1 | 4/2021 | Goel et al. | |

* cited by examiner

*Primary Examiner* — Ricky Q Ngo
*Assistant Examiner* — Kabir U Jahangir
(74) *Attorney, Agent, or Firm* — Quarles & Brady LLP

(57) ABSTRACT

Described herein are systems and methods to filter and classify multicast network traffic. In one example, a first computing node may receive a multicast communication from a second computing node and register a for a flow associated with the multicast communication, wherein the context includes at least the multicast port associated with the multicast communication. The first computing node further identifies an outbound communication destined for the second computing node and determines that addressing attributes in the outbound communication match the context for the flow. Once it is determined that the attributes match the context for the flow, the first computing node associates the outbound communication with the flow.

17 Claims, 4 Drawing Sheets

FILTERING AND CLASSIFYING MULTICAST NETWORK TRAFFIC

RELATED APPLICATIONS

Benefit is claimed to U.S. patent application Ser. No. 16/830,326 entitled "FILTERING AND CLASSIFYING MULTICAST NETWORK TRAFFIC", filed Mar. 26, 2020, which itself claims benefit under 35 U.S.C. 119(a)-(d) to Foreign Application Serial No. 202041001764 filed in India entitled "FILTERING AND CLASSIFYING MULTICAST NETWORK TRAFFIC", on Jan. 15, 2020, by VMware, Inc., which are herein incorporated in their entirety by reference for all purposes.

BACKGROUND

Network filtering solutions that work at the internet protocol (IP) address level can associate multiple communications, both inbound and outbound, to the same flow or the same communication traffic group. In particular, these network filtering operations may store addressing attributes associated with the communications to group the inbound and outbound communications associated with a computing node. The addressing attributes, sometimes referred to as a tuple or five tuple, may include the source IP address, source port, destination IP address, destination port, IP protocol, process identifier (PID) or some other addressing element.

When unicast communications are used, the addressing attributes of the inbound and outbound communications can be effectively correlated to a single packet flow. For example, a unicast communication from a first virtual machine to a second virtual machine may be associated with a response communication from the second virtual machine to the first virtual machine, as the addressing attributes will be the same from the inbound communication to the outbound communication.

However, while it is possible to associate inbound and outbound communications to the same flow in a unicast communication, difficulties arise when the sending computing element provides a communication request using multicast, wherein the communication request may be provided to multiple computing nodes. In particular, while a sending computing node may issue a multicast communication request using first addressing attributes, the response from the receiving computing node may replace at least one attribute, causing the response to be placed in a different flow (used to group inbound and outbound traffic) for the computing node.

OVERVIEW

The technology disclosed herein manages the filtering and classification of multicast network traffic. In one implementation, a first computing node obtains a multicast communication from a second computing node and registers a context for a flow associated with the multicast communication, wherein the context may include an internet protocol (IP) address associated with the first computing node, a multicast port identified in the multicast communication, an IP address associated with second computing node, a port associated with the second computing node, and an IP protocol. The first computing node further identifies an outbound communication destined for the second computing node, determines when addressing attributes in the outbound communication match the context for the flow and, when the addressing attributes in the outbound communication match the context for the flow, the first computing node may associate the outbound communication with the flow and process the outbound communication in accordance with policy rules associated with the flow.

DETAILED DESCRIPTION

Figure 1:
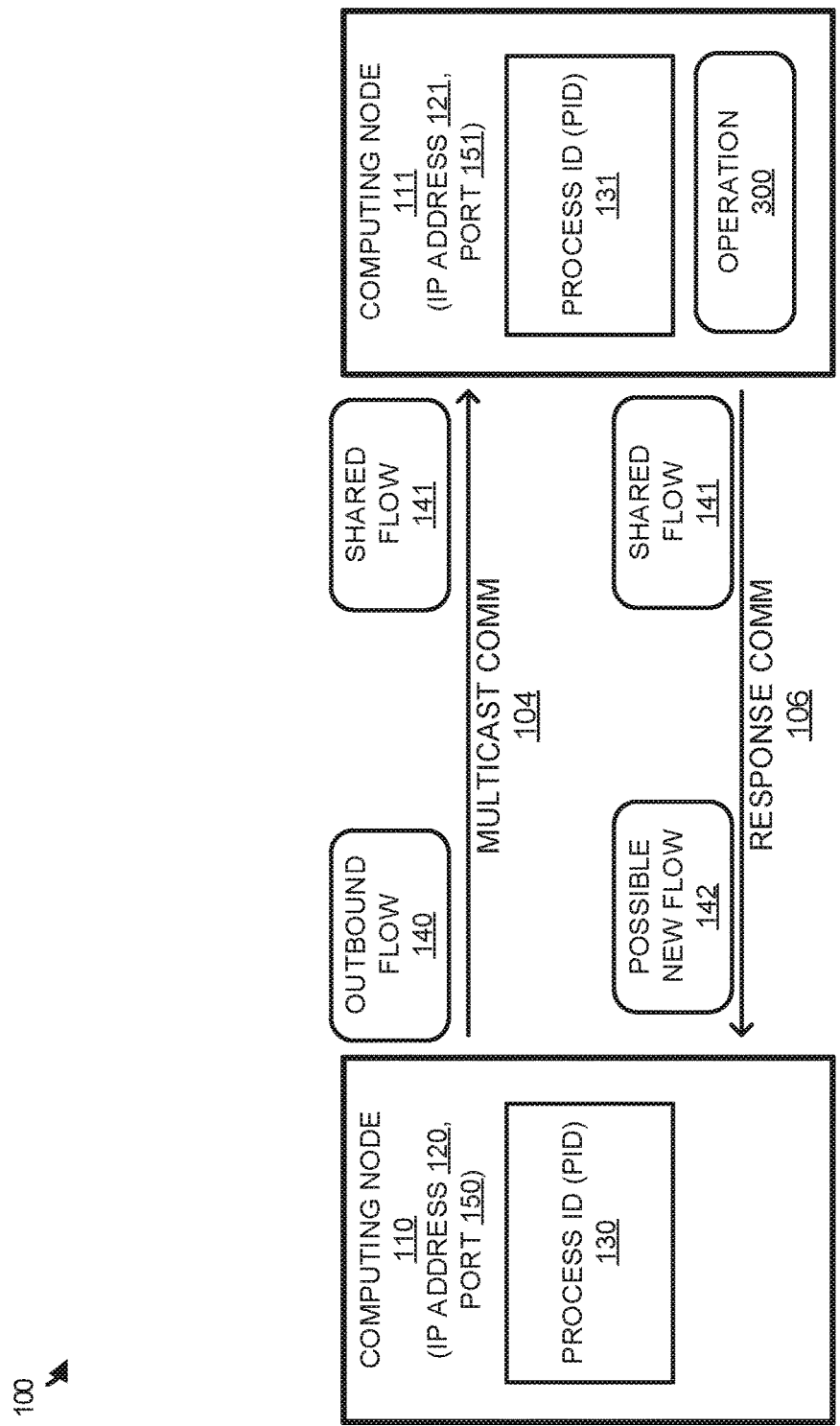
FIG. 1 illustrates a computing environment to manage and classify multicast network traffic according to an implementation.

FIG. 1 illustrates a computing environment 100 to manage and classify multicast network traffic according to an implementation. Computing environment 100 includes computing nodes 110-111, which are representative of virtual machines, containers, or some other virtualized endpoint. Computing environment 100 further includes a multicast communication 104 with flows 140-141 and a response communication 106 with flows 141-142. Computing node 110 further includes internet protocol (IP) address 120, port 150, and process identifier (PID) 130, while computing node 111 further includes IP address 121, port 151, and process identifier (PID) 131. Computing node 111 is further configured to provide operation 300, which is described in further detail using FIG. 3. An expanded view of flows 140-142 is demonstrated in operational scenario 200 of FIG. 2.

In operation, computing nodes 110-111 are deployed on one or more host computing systems to provide various operations, including data processing operations, front-end server operations, database management operations, or some other operation. Computing nodes 110-111 may comprise full operating system virtual machines in some examples, wherein the virtual machines may be supported by at least one hypervisor on the one or more host computing systems. The hypervisor is responsible for abstracting the components of the physical host and providing abstracted resources to the virtual machines, include processing resources, memory resource, network interface resources, storage resources or some other resource. In addition to providing a platform for the execution of the virtual machines, the hypervisor may further be used to support software defined networking (SDN) operations for the computing nodes 110-111. The SDN operations may include routing operations, switching operations, firewall operations, or some other networking operations.

In some implementations, a user associated with computing nodes 110-111 may desire filter and classify network traffic of the computing nodes. In classifying the network traffic, computing nodes 110-111 may maintain information about flows, which can include information about outbound and inbound communications with shared communication attributes. The flows may be used to monitor the network traffic in the computing environment, provide filtering or quality of service operations related to the traffic, or provide some other operation. In some examples, the shared attributes may be referred to as tuples or five tuples, wherein the attributes may comprise a sender IP address, a sender port address, a receiver IP address, a receiver port address, and IP protocol associated with the communication. However, the shared attributes may comprise fewer or additional attributes. It should be understood that the addressing attributes may be identified using packet inspection of the communications and used to associate communications with different flows.

In some examples, a computing node may use a multicast communication to generate notifications that are delivered to multiple computing systems. For example, although multicast communication 104 is provided to computing node 111, the same communication may be provided to one or more other computing nodes in a computing environment. Here, computing node 110 delivers multicast communication 104 that is associated with outbound flow 104 for computing node 110 and shared flow 141 for computing node 111. Multicast communication 104 may include addressing information that is unique to computing node 110 and may further include multicast addressing information that is used by the multiple destination computing nodes associated with the communication. Logical and physical networking devices may use multicast addressing to forward the communication to the computing nodes associated with the communication. Here, once the communication is received, computing node 111 may register a context for shared flow 141 based on addressing attributes identified in multicast communication 104. However, as the destination IP address for multicast communication 104 corresponds to an address for multiple computing nodes, the multicast IP address may not be used to identify a response communication, as the response may not use the multicast IP address. Instead, the response communication may use the IP address unique to computing node 111, or IP address 121. Thus, to group the response with the flow, the addressing attributes may include the multicast port that is used in responding to multicast request. The attributes may also include the IP and port addresses associated with computing node 110, the IP address associated with computing node 111, and the IP protocol associated with the multicast communication.

Additionally, once multicast communication 104 is received by computing node 111, a process executing on computing node 111 generates response communication 106 and communicates the response to computing node 110. When response communication 106 is generated, computing node 111 may identify the communication and determine whether the communication corresponds to a previously registered flow. In particular, computing node 111 may monitor the addressing attributes in the response communication and determine whether the addressing attributes match the context for shared flow 141. When a match exists, computing node 111 may group the communication with the flow. Otherwise, computing node 111 may register a new context associated with a new flow for the communication.

Once the packet is communicated by computing node 111 to computing node 110, computing node 110 may determine whether the inbound communication should be grouped with a preexisting flow. In some implementations, computing node 110 may use a timestamp associated with the communication to determine whether the communication should be associated with a preexisting flow of one or more flows or should be associated with a new flow. For example, based at least one the timestamp associated with response communication 106, computing node 110 may determine whether the communication is associated with multicast communication 104. Further, computing node 110 may perform packet inspection to determine whether the addressing attributes in response communication 106 correspond to an outbound flow, such as multicast communication 104.

Although described as a virtual machine in the previous example, it should be understood that computing nodes 110-111 may comprise containers in some examples, wherein the containers may comprise Linux containers, Docker containers, and other similar namespace-based containers. Rather than requiring a separate operating system, which is required for virtual machines, containers may share resources from the host computing system, wherein the resources may include kernel resources from the host operating system, and may further include repositories and other approved resources that can be shared with other containers or processes executing on the host. However, although resources may be shared between the containers on a host, the containers are provisioned to have private access to the operating system with their own identifier space, file system structure, and network interfaces. The operating system may also be responsible for allocating processing resources, memory resources, network resources, and other similar resources to the containerized endpoint. Additionally, although demonstrated as virtualized computing nodes, it should be understood that the computing nodes may comprise physical computing systems in some examples.

Figure 2:
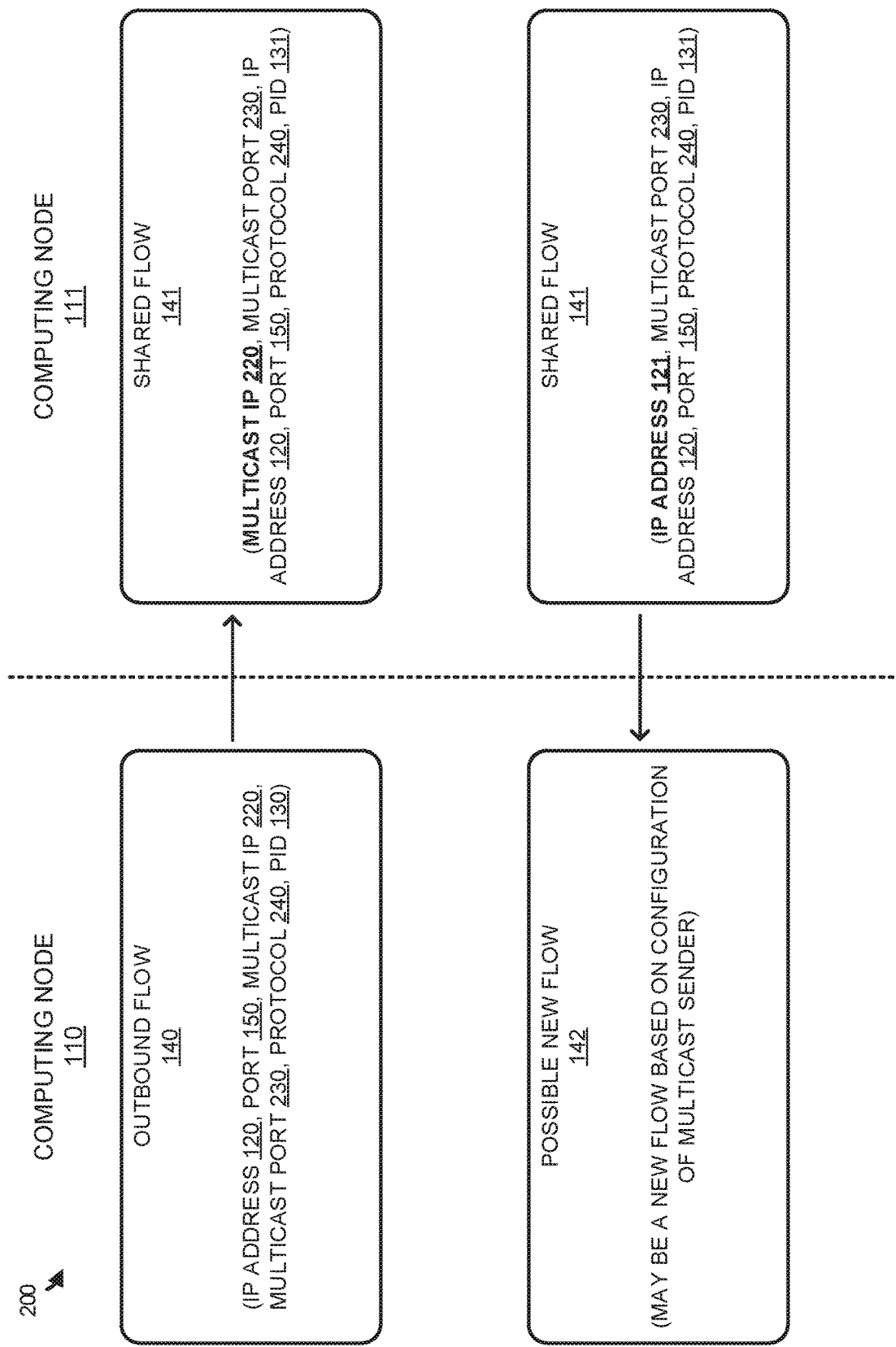
FIG. 2 illustrates an operational scenario of responding to a multicast communication according to an implementation.

FIG. 2 illustrates an operational scenario 200 of responding to a multicast communication according to an implementation. Operational scenario 200 includes outbound flow 140, shared flow 141, and possible new flow 142 from computing environment 100 of FIG. 1.

As depicted, outbound flow 140 is representative of a multicast communication that is communicated from computing node 110 to computing node 111. Outbound flow 110 includes IP address 120, port 150, IP multicast 220, port multicast 230, protocol 240, and PID 130. IP address 120 and port 150 correspond to computing node 110, IP multicast 230 and port multicast correspond to the shared IP address and port that are used to deliver a communication to computing nodes that belong of the multicast group, protocol 240 is representative of an IP protocol used for the communication, wherein the protocol may indicate Transmission Control Protocol (TCP), User Datagram Protocol (UDP), or some other IP protocol, and PID 130 is representative of the process identifier associated with generating the multicast communication. The multicast communication is provided to at least computing node 111 but may be communicated to one or more additional computing nodes that correspond to the same multicast group. As the packet is received, computing node 111 may generate a flow, represented as shared flow 141, wherein the attributes for shared flow 141 include multicast IP 220, multicast port 230, IP address 120, port 150, protocol 240, and PID 131. PID 131 is the PID that defines the process receiving the network connection at computing element 111.

However, while shared flow 141 is generated at receiving computing node 111 using the multicast IP address for the communication, computing node 111 may be required to change the attributes of the flow to identify responses from computing node 111 to computing node 110. In particular, computing node 111 may identify the multicast address that is used for the communication and register an additional or replacement local IP address for computing node 111 as part of the flow. As a result, while the original flow may use the multicast IP address for incoming communications, computing node 111 may modify the flow to identify the local IP address for computing node 111 in place of the multicast address.

When a response communication is generated by computing node 111, computing node 111 may compare the attributes in the communication to the attributes in a registered flow or flows. Using the example in response communication 106, the response includes IP address 121, multicast port 230, IP address 120, port 150, protocol 240, and PID 131. Here, the difference between the inbound communication and the outbound communication is the IP address associated with the sending computing node 111. Specifically, while the multicast communication may use a multicast address to communicate with multiple computing nodes, the return communication may be incapable of using the multicast address. Instead, when an outbound communication is identified that includes the same addressing attributes as the incoming multicast communication but replaces the multicast IP address with the local IP address 121, computing node 111 may identify that the communication corresponds to an existing flow. In at least one implementation, the flows may be used to manage policy rules or network filtering operations, such as firewall rules, quality of service rules, and the like. The flows may also be used to monitor packet flows between computing nodes or providing some other operation. In some examples, the policy rules may be implemented by computing nodes themselves, however, it should be understood that the computing nodes may communicate with a virtualization platform, such as a hypervisor, to implement the policy rules associated with the flow.

Once the communication is classified into a flow and communicated to computing node 110, computing node 110 may receive the communication and determine whether the communication should correspond to a new flow or a preexisting flow. In at least one example, computing node 110 may determine whether the communication should be classified for a new flow based on a timestamp associated with the communication. Computing node 110 may inspect the communication (packet), determine whether the communication matches attributes for an existing flow, and determine whether the communication were received within a time period associated with the flow. If the communication satisfies the criteria for an existing flow, then the communication may be added to the flow, while if the communication does not satisfy criteria for an existing flow, a new flow may be registered.

In some implementations, computing node 111 may maintain context for the flow for both the incoming and outgoing communications. In particular, a first context may be stored using multicast IP 220 that is associated with incoming communications from computing node 110. Additionally, computing node 111 may store a second context when a multicast IP is identified that includes IP address 121 that is associated with computing node 111.

Figure 3:
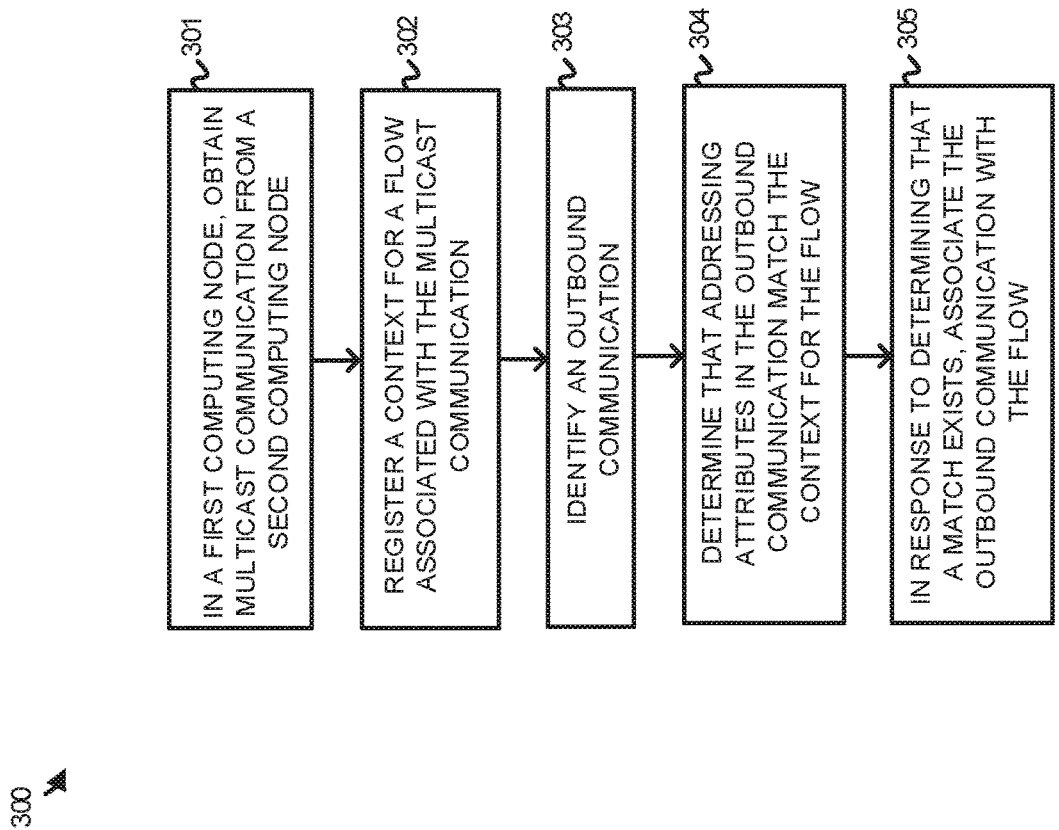
FIG. 3 illustrates an operation of a computing node to respond to a multicast communication according to an implementation.

FIG. 3 illustrates an operation 300 of a computing node to respond to a multicast communication according to an implementation. The processes of operation 300 are referenced parenthetically in the paragraphs that follow with reference to systems and elements of computing environment 100 of FIG. 1 and operational scenario 200 of FIG. 2.

As depicted, operation 300 includes, in a first computing node, obtaining (301) a multicast communication from a second computing node. The multicast communication may be used in a computing environment to permit a single communication to be distributed to multiple computing nodes, wherein the communication may be used to communicate audio or video data, to provide configuration information to the computing nodes, or provide some other multicast functionality. When the multicast communication is received, the first computing node may register (302) a context for a flow associated with the multicast communication. In some examples, the computing node may determine whether an existing flow exists for the multicast communication. When a flow does not exist, the first computing node may register a new context associated with a new flow for the communications. In some examples, the context may include an IP address associated with the first computing node, a multicast port identified in the multicast communication, an IP address associated with second computing node, a port associated with the second computing node, and an IP protocol for the communication.

In generating the context, the first computing node may determine that the incoming communication includes a destination multicast IP address. Once identified, the first computing node may, when registering the context, permit the replacement of the multicast IP address with an address unique to or associated with the first computing system. Thus, when an outbound communication is identified from the first computing node to the second computing node, the outbound communication may be classified into the same flow as the multicast communication, even with the replacement IP address.

After a context is registered, the first computing node may monitor for communications from a local process to the second computing node. While monitoring, the first computing node may identify (303) an outbound communication destined for the second computing node and determine (304) that addressing attributes in the outbound communication match the context for the flow. When the attributes match, the first computing node may associate (305) the outbound communication with the flow generated from the multicast inbound communication and process the communication in accordance with the flow. In some examples, the processing of the outbound communication may include processing the outbound communication in accordance with one or more policy rules associated with the multicast communication, wherein the policy rules may comprise firewall rules, quality of service rules, or some other similar rules. The quality of service rules may be used to place the packet in different processing queues, prioritize the packet over other packets, or provide some other operation.

In some implementations, when the communication is communicated to the second computing node, the second computing node may inspect the communication to determine whether the communication is associated with a new flow or a preexisting flow. This determination may be based on the addressing attributes in the packet, such as the IP addresses, port addresses, protocol information, and the like, and may further be based on a timestamp for the communication. When the packet is associated with an existing flow, the second computing system may add or associated the communication with the existing flow and process the communication in accordance with the flow. Further, when the packet is not associated with an existing flow, the second computing node may register context for a new flow.

Referring to an example of operation 300 using computing environment 100 of FIG. 1, computing node 110 generates multicast communication 104 that is provided to at least computing node 111 using a multicast IP address. Once received, computing node 111 may register shared flow 141 using context derived from communication attributes identified in multicast communication 104. In determining the context, computing node 111 may identify the use of a multicast IP address in the communication and permit the use of a local IP address for computing node 111 to respond to the multicast communication. Other information in the context may include a multicast port identified in the multicast communication, IP address 120, port 150, an IP protocol associated with the multicast communication, PID 131 from computing node 111, or some other addressing attributes. Once registered, computing node 111 may identify response communication 106, determine that addressing attributes match the context associated with shared flow 141, and add the communication to shared flow 141.

Figure 4:
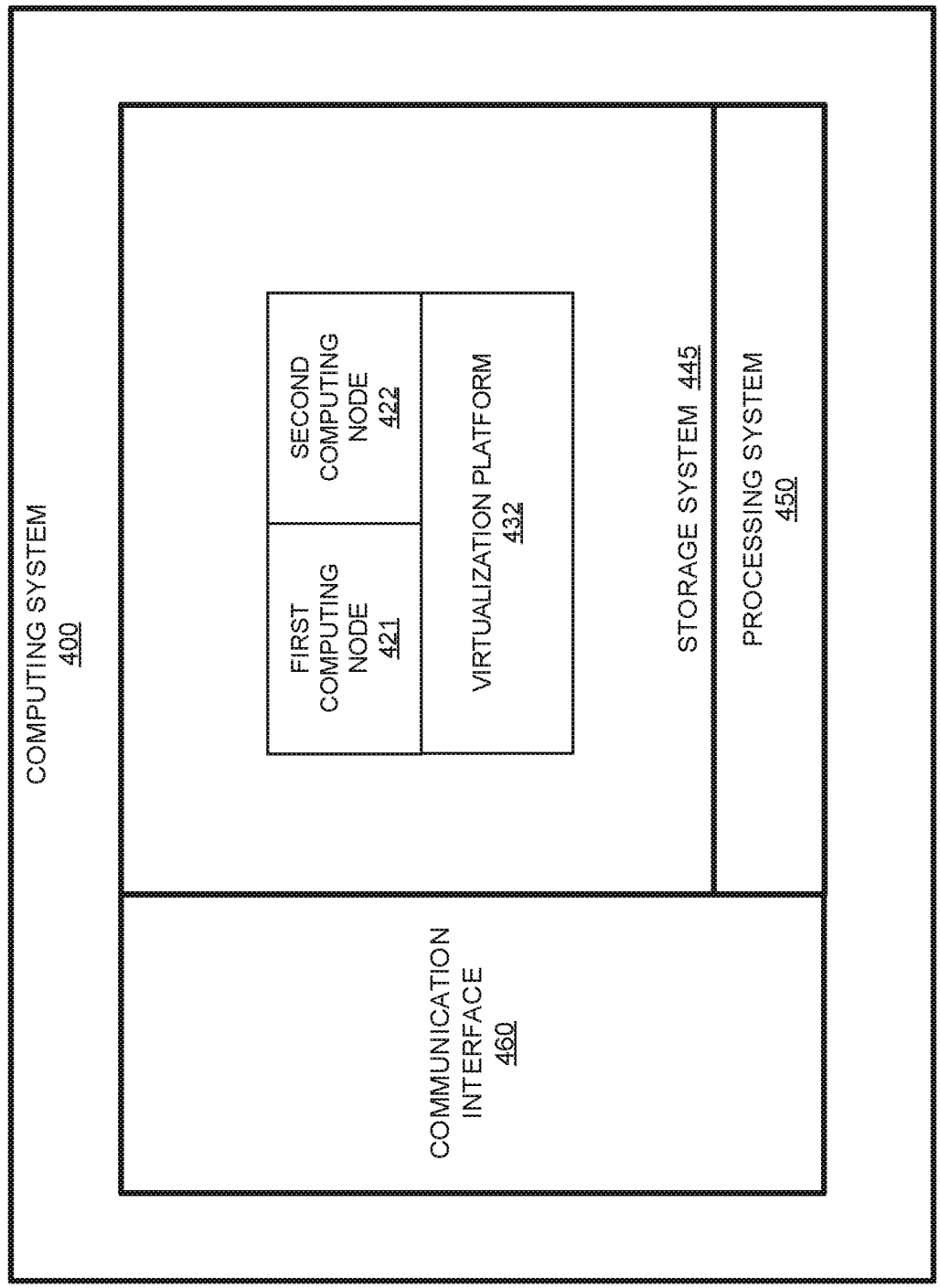
FIG. 4 illustrates a computing system to manage multicast communications between computing nodes according to an implementation.

FIG. 4 illustrates a computing system 400 to manage multicast communications between computing nodes according to an implementation. Computing system 400 is representative of any computing system or systems with which the various operational architectures, processes, scenarios, and sequences disclosed herein for a host computing system can be implemented. Computing system 400 includes storage system 445, processing system 450, and communication interface 460. Processing system 450 is operatively linked to communication interface 460 and storage system 445. Communication interface 460 may be communicatively linked to storage system 445 in some implementations. Computing system 400 may further include other components such as a battery and enclosure that are not shown for clarity.

Communication interface 460 comprises components that communicate over communication links, such as network cards, ports, radio frequency (RF), processing circuitry and software, or some other communication devices. Communication interface 460 may be configured to communicate over metallic, wireless, or optical links. Communication interface 460 may be configured to use Time Division Multiplex (TDM), Internet Protocol (IP), Ethernet, optical networking, wireless protocols, communication signaling, or some other communication format—including combinations thereof. Communication interface 460 is an example of a physical network interface that can be configured to communicate with other computing systems to provide required operations for the processes executing on computing system 400. In at least one example, communication interface 460 may be used to communicate with one or more other host computing systems that provide a platform for virtual computing nodes.

Processing system 450 comprises microprocessor and other circuitry that retrieves and executes operating software from storage system 445. Storage system 445 may include volatile and nonvolatile, removable and non-removable media implemented in any method or technology for storage of information, such as computer readable instructions, data structures, program modules, or other data. Storage system 445 may be implemented as a single storage device but may also be implemented across multiple storage devices or sub-systems. Storage system 445 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 450 is typically mounted on a circuit board that may also hold the storage system. The operating software of storage system 445 comprises computer programs, firmware, or some other form of machine-readable program instructions. The operating software of storage system 445 comprises first computing node 421, second computing node 422, and virtualization platform 432. The operating software on storage system 445 may further include utilities, drivers, network interfaces, applications, or some other type of software. When read and executed by processing system 450 the operating software on storage system 445 directs computing system 400 to operate as described herein.

In at least one implementation, virtualization platform 432 provides a platform for computing nodes 421-422, wherein computing nodes 421-422 may comprise a virtual machine or some other containerized endpoint. This may include providing processing resources, storage resources, memory resources, networking resources, and the like to each of the computing nodes.

Additionally, virtualization platform 432 may provide software defined networking operations for computing nodes 421-422, such as firewall operations, routing operations, switching operations, and the like. In some implementations, computing nodes within a computing environment may use multicast communications to provide data to multiple other computing elements. For example, first computing node 421 may generate a multicast that is communicated to second computing node 422 and one or more other computing nodes. The multicast communication may include an IP address associated with first computing node 421, a port address associated with first computing node 421, a multicast IP address, a multicast port address, and other addressing information.

When the communication is received by second computing node 422, second computing node 422 may register a context for a flow associated with the multicast communication. This context may include at least the IP address associated with first computing node 421, the port address associated with first computing node 421, the multicast port address, and an IP address uniquely associated with second computing node 422. In particular, any response communication from second computing node 422 to first computing node 421 will not use the multicast IP address as the source IP address. Instead, the response may use an IP address uniquely assigned to second computing node 422. As a result, when a multicast communication is identified, a context may be generated that replaces the multicast IP address with a different IP address associated with second computing node 422.

Once the context is registered associated with the multicast communication, second computing node 422 may identify an outbound communication from a process on the computing node destined for first computing node 421. Second computing node 422 may then compare addressing attributes in the outbound communication to the context to determine whether a match exists. When a match exists, the outbound communication is associated with the flow for the multicast communication and processed in accordance with any rules associated with the flow. In some examples, the processing of the outbound communication may include processing the outbound communication in accordance with one or more policy rules associated with the multicast communication, wherein the policy rules may comprise firewall rules, quality of service rules, or some other similar rules. The quality of service rules may be used to place the packet in different processing queues, prioritize the packet over other packets, or provide some other operation. In some examples, the policy rules may be implemented by virtual nodes themselves, however, it should be understood that at least a portion of the policy rules may be implemented by virtualization platform 432.

Although demonstrated on the same physical host, it should be understood that the computing nodes may be located on different hosts in some examples. Further, it should be understood that at least one of the computing nodes may comprise a physical computing system in some examples.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   in a first computing node, generating a multicast communication, wherein the multicast communication uses a multicast internet protocol (IP) address as a destination IP address;
   in the first computing node, associating the multicast communication with a flow;
   in the first computing node, communicating the multicast communication to a second computing node;
   in the first computing node, receiving a second communication from the second computing node, wherein the second communication uses a second IP address associated with the second computing node as a source IP address;
   in the first computing node, determining whether the second communication is received within a timeout period associated with the multicast communication;
   in the first computing node and when the second communication is received within the timeout period associated with the multicast communication, associating the second communication with the flow; and
   in the first computing node and when the second communication is not received within the timeout period associated with the multicast communication, associating the second communication with a second flow.

2. The method of claim 1 further comprising, in the first computing node, communicating the multicast communication to one or more additional computing nodes.

3. The method of claim 1, wherein the first computing node and the second computing node comprise virtual machines.

4. The method of claim 1, wherein the first computing node and the second computing node comprise containers.

5. The method of claim 1 further comprising:
   in the second computing node, obtaining the multicast communication from the first computing node;
   in the second computing node, registering a context for a second flow associated with the multicast communication, wherein the context comprises at least the IP address associated with the second computing node that is different than the multicast IP address;
   in the second computing node, identifying the second communication destined for the first computing node;
   in the second computing node, determining that addressing attributes in the second communication match the context for the second flow; and
   in the second computing node and in response to determining that the addressing attributes in the second communication match the context for the second flow, processing the second communication in accordance with one or more policy rules for the second flow.

6. The method of claim 5, wherein the context further comprises an IP address associated with the first computing node, a multicast port identified in the multicast communication, and a port associated with the first computing node.

7. The method of claim 1, wherein the multicast communication and the second communication comprise the same ports for the first computing system and the second computing system.

8. A system comprising:
   a first computing node; and
   a second computing node;
   the first computing node configured to:
      generate a multicast communication, wherein the multicast communication uses a multicast internet protocol (IP) address as a destination IP address;
      associate the multicast communication with a flow;
      communicate the multicast communication to the second computing node;
      receive a second communication from the second computing node, wherein the second communication uses a second IP address associated with the second computing node as a source IP address;
      determine whether the second communication is received within a timeout period associated with the multicast communication;
      when the second communication is received within the timeout period associated with the multicast communication, associate the second communication with the flow; and
      when the second communication is not received within the timeout period associated with the multicast communication, associate the second communication with a second flow.

9. The system of claim 8, wherein the first computing node is further configured to:
   communicating the multicast communication to one or more additional computing nodes.

10. The system of claim 8, wherein the second computing node is further configured to:
    obtain the multicast communication from the first computing node;
    register a context for a second flow associated with the multicast communication, wherein the context comprises at least the IP address associated with the second computing node that is different than the multicast IP address;
    identify the second communication destined for the first computing node;
    determining that addressing attributes in the second communication match the context for the second flow; and
    in response to determining that the addressing attributes in the second communication match the context for the second flow, process the second communication in accordance with one or more policy rules for the second flow.

11. The system of claim 10, wherein the context further comprises an IP address associated with the first computing node, a multicast port identified in the multicast communication, and a port associated with the first computing node.

12. The system of claim 10, wherein the second computing node is further configured to communicate the second communication to the first computing node.

13. The system of claim 8, wherein the multicast communication and the second communication comprise the same ports for the first computing system and the second computing system.

14. A computing apparatus comprising:
- a storage system;
- a processing system operatively coupled to the storage system; and
- program instructions stored on the storage system that, when executed by the processing system, direct the computing apparatus to:
  - in a first computing node, generate a multicast communication, wherein the multicast communication uses a multicast internet protocol (IP) address as a destination IP address;
  - in the first computing node, associate the multicast communication with a flow;
  - in the first computing node, communicate the multicast communication to a second computing node;
  - in the first computing node, receive a second communication from the second computing node, wherein the second communication uses a second IP address associated with the second computing node as a source IP address;
  - in the first computing node, determine whether the second communication is received within a timeout period associated with the multicast communication;
  - in the first computing node and when the second communication is received within the timeout period associated with the multicast communication, associate the second communication with the flow; and
  - in the first computing node and when the second communication is not received within the timeout period associated with the multicast communication, associating the second communication with a second flow.

15. The computing apparatus of claim 14, wherein the program instructions further direct the computing apparatus to:
- communicate the multicast communication to one or more additional computing nodes.

16. The computing apparatus of claim 14, wherein the first computing node and the second computing node comprise containers or virtual machines.

17. The computing apparatus of claim 14, wherein the multicast communication and the second communication comprise the same ports for the first computing system and the second computing system.

* * * * *